(12) United States Patent
Mizoguchi

(10) Patent No.: US 11,267,468 B2
(45) Date of Patent: Mar. 8, 2022

(54) AUTOMATIC DRIVING ASSISTANCE APPARATUS

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 120 days.

(21) Appl. No.: 16/744,916

(22) Filed: Jan. 16, 2020

(65) Prior Publication Data

US 2020/0307579 A1 Oct. 1, 2020

(30) Foreign Application Priority Data

Mar. 28, 2019 (JP) .............................. JP2019-064499

(51) Int. Cl.
| | |
|---|---|
| *B60W 30/18* | (2012.01) |
| *B62D 6/00* | (2006.01) |
| *B60W 50/00* | (2006.01) |
| *B60W 30/14* | (2006.01) |
| *B62D 15/02* | (2006.01) |

(52) U.S. Cl.
CPC .... *B60W 30/146* (2013.01); *B60W 30/18163* (2013.01); *B62D 6/001* (2013.01); *B62D 15/0255* (2013.01); *B60W 2050/0002* (2013.01)

(58) Field of Classification Search
CPC .. B62D 15/025; B62D 6/001; B62D 15/0255; B60W 2552/53; B60W 30/146; B60W 30/18163; B60W 2050/0002; G06T 2207/30256; G06K 9/00798
See application file for complete search history.

(56) References Cited

U.S. PATENT DOCUMENTS

| | | | | |
|---|---|---|---|---|
| 8,385,600 | B2 * | 2/2013 | Nara .................. | G06K 9/00798 382/104 |
| 11,192,554 | B2 * | 12/2021 | Okajima ......... | B60W 30/18163 |
| 2009/0138193 | A1 * | 5/2009 | Katou ................ | G01C 21/3655 701/533 |

(Continued)

FOREIGN PATENT DOCUMENTS

WO 2016/063383 A1 4/2016

*Primary Examiner* — Jeff A Burke
*Assistant Examiner* — Joshua Alexander Garza
(74) *Attorney, Agent, or Firm* — McDermott Will & Emery LLP

(57) ABSTRACT

An automatic driving assistance apparatus includes a driving state acquirer, an own vehicle location acquirer, a traveling environment information acquirer, a branch lane determining unit, a lane change calculator, and a traveling state controller. The driving state acquirer acquires a driving state of an own vehicle. The own vehicle location acquirer acquires a location of the own vehicle. The traveling environment acquirer acquires a traveling environment in which the own vehicle is traveling. The branch lane determining unit examines whether a target travel path toward which the own vehicle travels is set to a branch lane direction. The lane change calculator obtains a deceleration start position and a lane change start position of the own vehicle. The traveling state controller controls a traveling state of the own vehicle based on the deceleration start position and the lane change start position.

12 Claims, 7 Drawing Sheets

(56) References Cited

U.S. PATENT DOCUMENTS

| | | | |
|---|---|---|---|
| 2010/0161192 A1* | 6/2010 | Nara | G01C 21/26 |
| | | | 701/70 |
| 2010/0299063 A1* | 11/2010 | Nakamura | G06K 9/00798 |
| | | | 701/532 |
| 2013/0103304 A1* | 4/2013 | Nishibashi | G01C 21/34 |
| | | | 701/410 |
| 2016/0176413 A1* | 6/2016 | Oguri | B60W 20/14 |
| | | | 701/22 |
| 2017/0225681 A1* | 8/2017 | Motoyama | B60W 50/14 |
| 2017/0227966 A1* | 8/2017 | Monzen | B62D 15/0255 |
| 2017/0320521 A1 | 11/2017 | Fujita | |
| 2019/0018409 A1* | 1/2019 | Nickolaou | B60W 50/16 |
| 2019/0135281 A1* | 5/2019 | Miura | G05D 1/0088 |
| 2019/0369626 A1* | 12/2019 | Lui | G05D 1/0219 |
| 2020/0070835 A1* | 3/2020 | Fukuda | B60W 60/001 |
| 2020/0247413 A1* | 8/2020 | Fukuda | B60W 30/18163 |
| 2020/0284610 A1* | 9/2020 | Hatayama | G01C 21/3658 |
| 2020/0307593 A1* | 10/2020 | Hirosawa | B60W 50/10 |

* cited by examiner

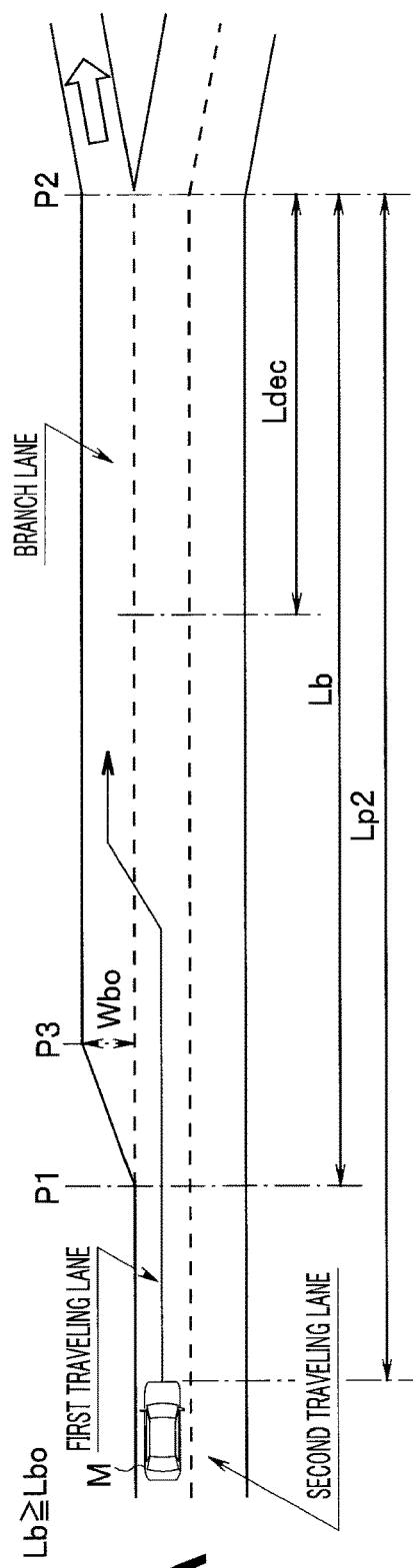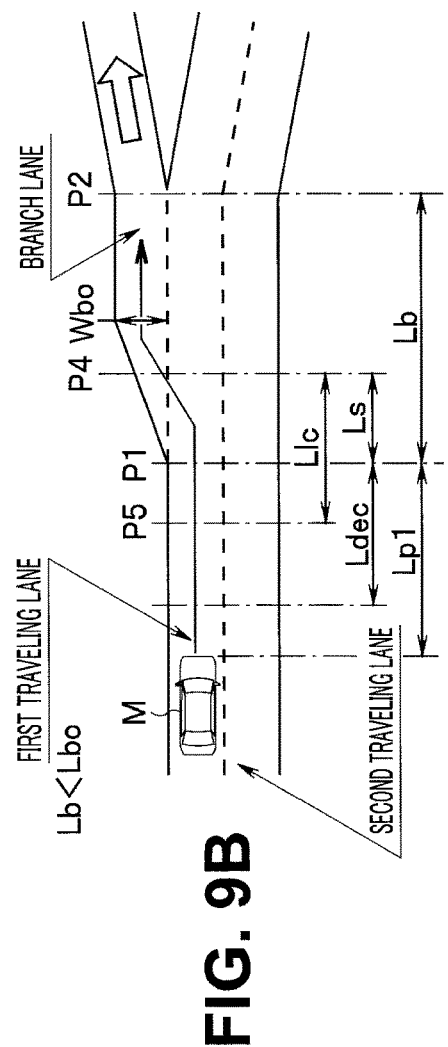

AUTOMATIC DRIVING ASSISTANCE APPARATUS

CROSS-REFERENCE TO RELATED APPLICATIONS

The present application claims priority from Japanese Patent Application No. 2019-064499 filed on Mar. 28, 2019, the entire contents of which are hereby incorporated by reference.

BACKGROUND

The technology relates to an automatic driving assistance apparatus configured to control a deceleration start position and a lane change start position when an own vehicle changes a lane from a main lane to a branch lane side.

When a target travel path toward which an own vehicle is to be made to travel by automatic driving is set to a branch lane direction from a lane (travel lane) on which the own vehicle is currently traveling, the automatic driving assistance apparatus, first, causes the own vehicle to change the lane to the travel lane connected to the branch lane and then, to change the lane to the branch lane direction in the vicinity of an entrance of the branch lane.

As disclosed in International Publication No. WO2016/063383, for example, in a lane change to the branch lane direction, first, a reference point for the lane change is acquired, a distance between the reference point and the own vehicle is acquired, and a deceleration pattern which is a set vehicle speed at the reference point is calculated. Then, a target vehicle speed at the reference point is set based on the deceleration pattern, and the lane change is made when the vehicle reaches the reference point.

SUMMARY

An aspect of the technology provides an automatic driving assistance apparatus. The automatic driving assistance apparatus includes a driving state acquirer, an own vehicle location acquirer, a traveling environment information acquirer, a branch lane determining unit, a lane change calculator, and a traveling state controller. The driving state acquirer acquires a driving state of an own vehicle. The own vehicle location acquirer acquires a location of the own vehicle. The traveling environment acquirer acquires a traveling environment in which the own vehicle is traveling. The branch lane determining unit examines whether a target travel path toward which the own vehicle travels is set to a branch lane direction. When the branch lane determining unit determines that the target travel path is set to the branch lane direction, the lane change calculator obtains a deceleration start position and a lane change start position of the own vehicle, based on the driving state acquired by the driving state acquirer and the traveling environment acquired by the traveling environment acquirer. The traveling state controller controls the traveling state of the own vehicle based on the deceleration start position and the lane change start position obtained by the lane change calculator.

An aspect of the technology provides an automatic driving assistance apparatus. The automatic driving assistance apparatus includes circuitry. The circuitry acquires a driving state of an own vehicle. The circuitry acquires a location of the own vehicle. The circuitry acquires a traveling environment on which the own vehicle is traveling. The circuitry examines whether a target travel path toward which the own vehicle travels is set to a branch lane direction. When it is determined that the target travel path is set to the branch lane direction, the circuitry obtains a deceleration start position and a lane change start position of the own vehicle based on the driving state and the traveling environment. The circuitry obtains controls a traveling state of the own vehicle based on the obtained deceleration start position and the lane change start position.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 9A is an explanatory diagram illustrating a lane change start position when the entrance length of the branch lane is long; and FIG. 9B is an explanatory diagram illustrating the lane change start position when the entrance length of the branch lane is long.

DETAILED DESCRIPTION

Figure 1:
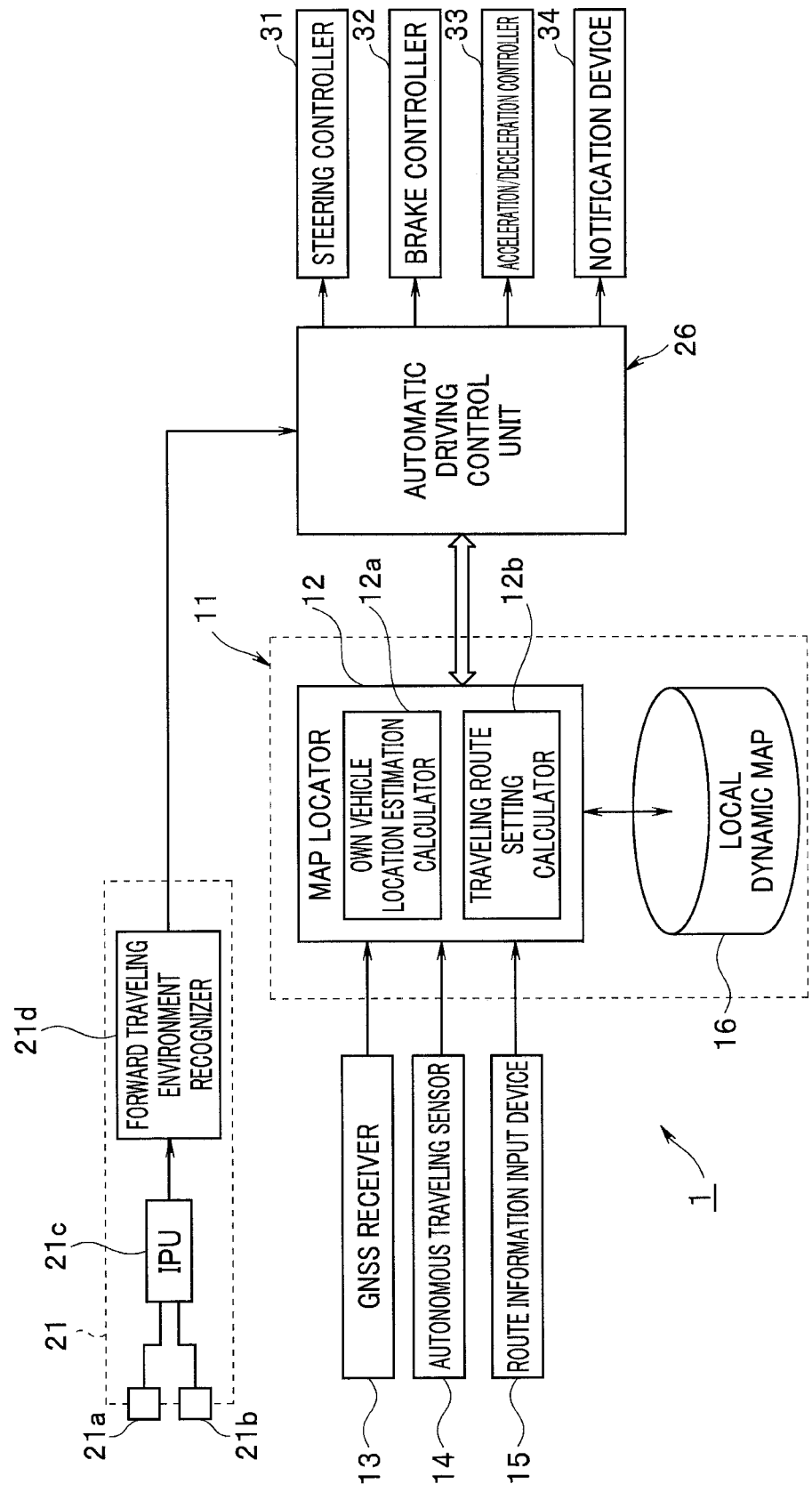
FIG. 1 is a schematic configuration diagram of an automatic driving assistance apparatus.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A length of an entrance of a branch lane connected to a main lane is not constant, and in a case of an expressway, the length is different at each interchange or junction. However, in the technology disclosed in the publication above, since a lane change is started when a branch point is reached regardless of the length of the entrance of the branch lane, if the entrance length of the branch lane is short, for example, the lane change is made with rapid steering or rapid deceleration, which gives an unpleasant feeling to an occupant of the own vehicle.

There can be such a measure that, if the entrance length of the branch lane is short, gentle deceleration such as an engine brake is started considerably before reaching the entrance, and the lane change is made at a reference point at a sufficiently decelerated vehicle speed. However, such gentle deceleration is determined by the occupant as unnecessary deceleration before the lane change to the branch lane and rather gives an unpleasant feeling. Moreover, the gentle deceleration is also determined by a following vehicle as unnecessary deceleration and gives a sense of discomfort to the driver of the following vehicle.

Thus, in the technology, it is desirable to provide an automatic driving assistance apparatus which can smoothly cause a lane change to be made without giving an unpleasant feeling or a sense of discomfort to an occupant of an own vehicle or a driver of a following vehicle when a lane change is to be made from a main lane to a branch lane direction by automatic driving.

An embodiment of the technology will be described below based on the drawings. Reference numeral 1 in FIG. 1 denotes an automatic driving assistance apparatus configured to perform automatic driving and is mounted on an own vehicle M (see FIG. 9). The automatic driving assistance apparatus 1 includes a locator unit 11, a camera unit 21 as a traveling environment acquirer, and an automatic driving control unit 26.

The locator unit 11 has a map locator calculator 12 and a high-accuracy road map database 16 as a storage unit. The map locator calculator 12, a forward traveling environment recognizer 21d which will be described later, and the automatic driving control unit 26 are configured by a well-known microcomputer including a CPU, RAM, ROM, a nonvolatile storage unit and the like and peripheral equipment thereof, and fixed data such as a program executed by the CPU, a data table and the like are stored in the ROM in advance.

A Global Navigation Satellite System (GNSS) receiver 13 as an own vehicle location acquirer, an autonomous traveling sensor 14 as a driving state acquirer, and a route information input device 15 are coupled with an input side of the map locator calculator 12. The GNSS receiver 13 receives positioning signals transmitted from a plurality of positioning satellites. The autonomous traveling sensor 14 enables autonomous traveling in an environment in which a reception sensitivity from the GNSS satellite is low, and a positioning signal cannot be effectively received such as traveling in a tunnel, and is configured by a vehicle speed sensor, a yaw rate sensor, a forward/backward acceleration sensor and the like. That is, the map locator calculator 12 executes localization from a moving distance and an azimuth based on a vehicle speed detected by the vehicle speed sensor, a yaw rate (yaw angle speed) detected by the yaw rate sensor, the forward/backward acceleration detected by the forward/backward acceleration sensor and the like.

The route information input device 15 is a terminal device operated by an occupant (mainly, a driver). That is, the route information input device 15 can intensively receive an input of a series of information required in setting of a traveling route by the map locator calculator 12, such as setting of a destination and a transit point (a rest area on an expressway or the like).

For example, the route information input device 15 is an input unit of a car navigation system (a touch panel on a monitor, for example), a mobile terminal such as a smart phone, a personal computer or the like and is coupled to the map locator calculator 12 wiredly or wirelessly.

When the occupant operates the route information input device 15 and inputs information of the destination or the transit point (a facility name, an address, a telephone number and the like), the input information is read by the map locator calculator 12.

When the destination or transit point is input, the map locator calculator 12 sets the position coordinate (latitude, longitude) of the destination or transit point. The map locator calculator 12 includes an own vehicle location estimation calculator 12a as an own vehicle location estimator configured to estimate an own vehicle location and a traveling route setting calculator 12b configured to set a traveling route from the own vehicle location to the destination (and the transit point).

The high-accuracy road map database 16 is a large-capacity storage medium such as an HDD and stores high-accuracy and well-known road map information (local dynamic map). The high-accuracy road map information has a hierarchical structure in which additional map information required for assisting the automatic driving is superposed on a static information hierarchy on a lowermost hierarchy as a base. The additional map information includes static position information such as a type of the road (ordinary road, expressway and the like), a road shape, right and left lane markers, exits of the expressway, a bypass road and the like, an entrance length (a start position and an end position) of a branch lane continuing to a junction or a rest area and the like and dynamic position information such as traffic jam information, traffic restriction due to an accident or a construction work.

The own vehicle location estimation calculator 12a obtains a current position coordinate (latitude, longitude) of the own vehicle M based on the positioning signal received by the GNSS receiver 13, performs map-matching of the position coordinate on the map information and estimates the own vehicle location (current location) on the road map. Moreover, the own vehicle location estimation calculator 12 specifies an own vehicle travel lane, obtains a road shape of the travel lane stored in the map information, and sequentially stores the obtained road shape in the road map database 16. Furthermore, in an environment where the effective positioning signal from the positioning satellite cannot be received due to a lowered sensitivity of the GNSS receiver 13 as in traveling in a tunnel, the own vehicle location estimation calculator 12a switches to an autonomous navigation and executes localization by the autonomous traveling sensor 14.

The traveling route setting calculator 12b refers to the local dynamic map stored in the high-accuracy road map database 16 based on the position information (latitude, longitude) of the own vehicle location estimated by the own vehicle location estimation calculator 12a and the position information (latitude, longitude) of the input destination (and the transit point). Then, the traveling route setting calculator 12b constructs a traveling route connecting the own vehicle location and the destination (when the transit point is set, the destination via the transit point) on the local dynamic map in accordance with route conditions (recommended route, fastest route and the like) set in advance.

On the other hand, the camera unit 21 is fixed at the center on the upper part of the front part in the vehicle interior of the own vehicle M and has an onboard camera (stereo camera) including a main camera 21a and a sub camera 21b disposed at symmetric positions with a center in a vehicle width direction between them, an image processing unit (IPU) 21c, and the forward traveling environment recognizer 21d. The camera unit 21 picks up an image of reference image by the main camera 21a and picks up an image of a comparative image by the sub camera 21b.

The both image data are processed in a predetermined way by the IPU 21c. The forward traveling environment recognizer 21d reads the reference image data and the comparative image data image-processed by the IPU 21c and recognizes the same target in the both images based on the parallax of the images and also calculates distance data thereof (a distance from the own vehicle M to the target) by using the principle of triangulation, and recognizes the forward traveling environment information.

The forward traveling environment information includes a road shape (lane markers marking right and left of the lane, a road curvature [1/m] at the center between the lane markers, and a width (lane width) between the right and left lane markers) of the lane (travel lane) on which the own vehicle M is traveling, exits of an expressway, a bypass road and the like, a lane width between the lane markers on the branch lane side continuing to the junction, an intersection, a pedestrian crossing, a signal, a road sign, and a road side obstacle (an electric pole, a telegraph pole, a parked vehicle and the like).

The automatic driving control unit 26 has the forward traveling environment recognizer 21d of the camera unit 21 coupled to the input side. The automatic driving control unit 26 is coupled to the map locator calculator 12 via an in-vehicle communication line (a CAN: Controller Area Network, for example), and is capable of bidirectional communication. Moreover, a steering controller 31 that causes the own vehicle M to travel along the traveling route, a brake controller 32 that decelerates the own vehicle M by forced braking, an acceleration/deceleration controller 33 that controls a vehicle speed of the own vehicle M, and a notification device 34 such as a monitor, a speaker and the like are coupled to an output side of the automatic driving control unit 26.

When an automatic driving section in which the automatic driving control is allowed is set in the traveling route set by the traveling route setting calculator 12b, the automatic driving control unit 26 sets a target travel path for performing automatic driving in the automatic driving section. In the automatic driving section, the steering controller 31, the brake controller 32, and the acceleration/deceleration controller 33 are controlled in the predetermined way, and the own vehicle M is made to automatically travel along the target travel path based on the positioning signal indicating the own vehicle location received by the GNSS receiver 13.

At that time, when a preceding vehicle is detected by the well-known Adaptive Cruise Control (ACC control) and Active Lane Keep (ALK) control based on the forward traveling environment recognized by the forward traveling environment recognizer 21d, the own vehicle M is made to follow the preceding vehicle, and when a preceding vehicle is not detected, the own vehicle M is made to travel at the set vehicle speed within a speed limit.

If the target travel path is set to the branch lane side branching from the main lane, and the lane is to be changed to the branch lane direction from the main lane, first, timing for the lane change and timing for starting deceleration to reach the target vehicle speed in the lane change (deceleration start distance) are set. In this case, the timings are different depending on an entrance length Lb of the branch lane continuing to the main lane.

FIGS. 9A and 9B illustrate a state where the main lane has two lanes on one side (a first travel lane and a second travel lane), and a branch lane is connected to the first travel lane. As illustrated in FIG. 9A, when the entrance length (a distance from an entrance start point P1 to an entrance end point P2) Lb is relatively long, even if the lane change is started after having passed a position Wbo where a lane width Wb of the branch lane becomes constant, entry to the branch lane direction can be made with a stable attitude.

On the other hand, as illustrated in FIG. 9B when the entrance length Lb is relatively short, the lane change needs to be started before the lane width Wb becomes constant in order to realize entry with a stable attitude without turning the own vehicle M abruptly to the branch lane direction.

Thus, in the lane change to the branch lane direction in the automatic driving section, the automatic driving control unit 26 sets the lane change timing and the deceleration start timing according to the entrance length Lb of the branch lane in order to allow the own vehicle M to enter the branch lane direction with the stable attitude.

The aforementioned automatic driving assistance control accompanying the lane change to the branch lane direction executed by the automatic driving control unit 26 is processed in accordance with flowcharts illustrated in FIGS. 2 to 5.

Figure 2:
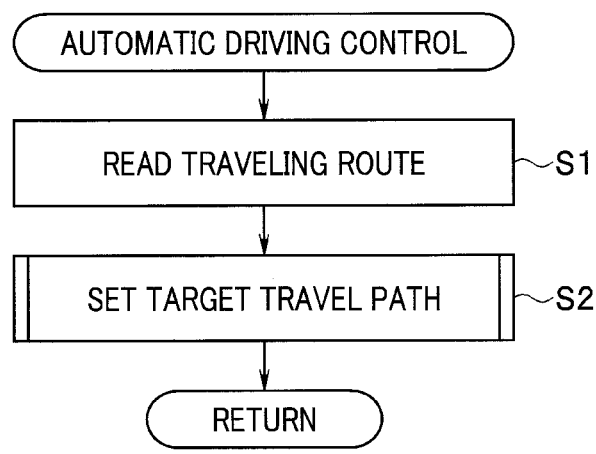
FIG. 2 is a flowchart illustrating an automatic driving control routine.

When a system is activated, first, an automatic driving control routine illustrated in FIG. 2 is started, and a traveling route set by the traveling route setting calculator 12b of the map locator calculator 12 is read at step S1. Then, the processing proceeds to step S2, the target travel path toward which the own vehicle M is to be made to travel by the automatic driving control is set on the traveling route, and the processing exits from the routine. The traveling route set by the traveling route setting calculator 12b is changed at every moment in accordance with a road situation and thus, the automatic driving control unit is repeatedly executed at each predetermined calculation cycle.

The target travel path set at step S2 is set from several hundred meters to several kilometers ahead of the own vehicle M, and control conditions required for automatically traveling the own vehicle M along the traveling route not by an operation by the driver are set. The control conditions include on which travel lane (the first travel lane or the second travel lane in the case of two lanes) the own vehicle M is made to travel, a target route for the lane change when the travel lane is changed, a target route for causing the own vehicle to enter the branch lane (a junction, an exit of an expressway, a bypass road and the like) and the like.

When the traveling route is other than the automatic driving section, the automatic driving control routine itself is not started, and the driver manually drives the own vehicle M along the traveling route displayed on the monitor of the car navigation system. At that time, the driving assistance control by the well-known ACC control and ALK control is executed for the straight traveling road.

Figure 3:
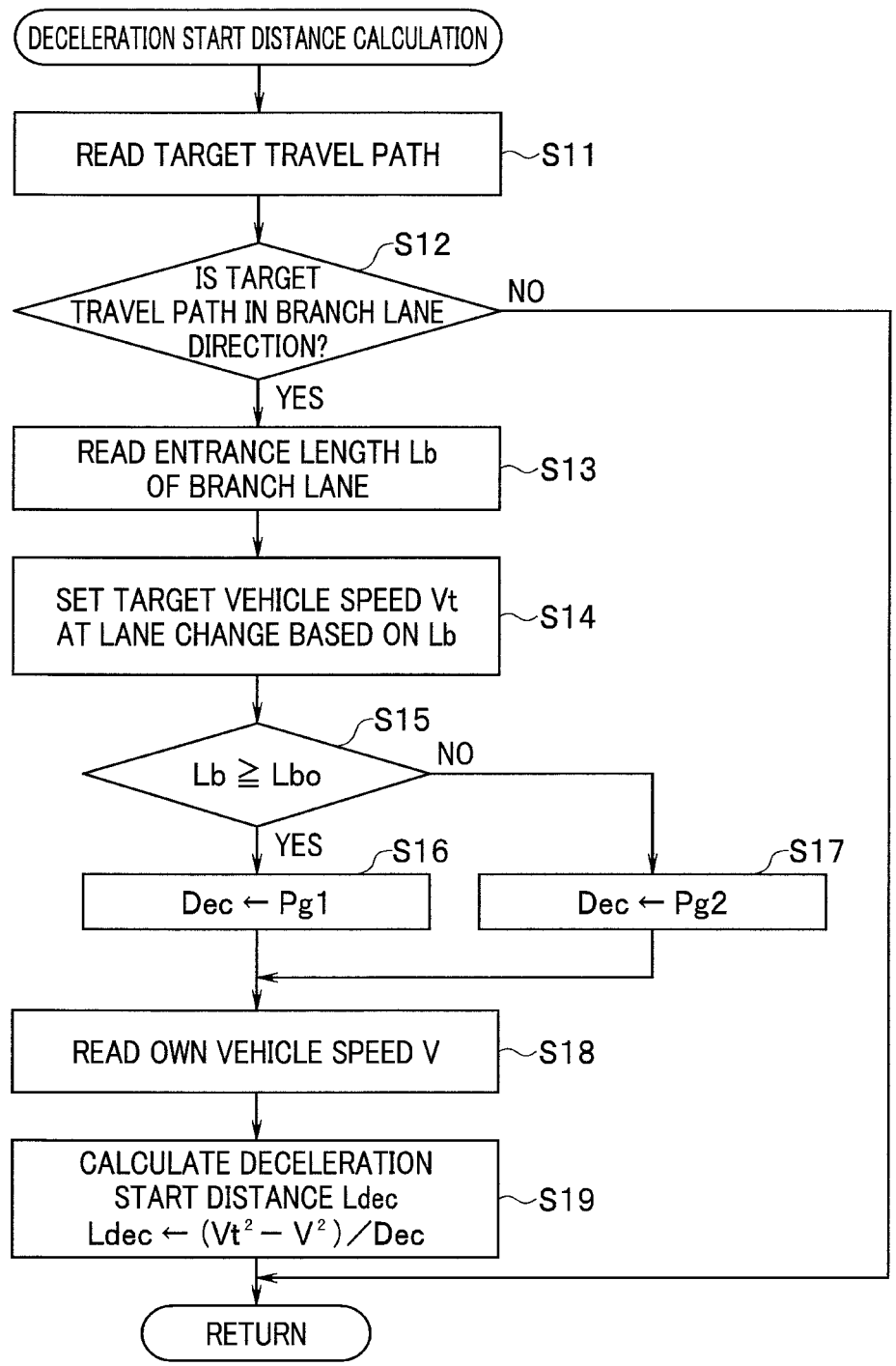
FIG. 3 is a flowchart illustrating a deceleration start distance calculation routine.

The target travel path set at aforementioned step S2 is read in a deceleration start distance calculation routine illustrated in FIG. 3. The processing in the routine corresponds to the deceleration start distance calculator of the technology.

In the routine, first, the target travel path is read at step S11, the processing proceeds to step S12, and whether the target travel path is set to the branch lane direction is examined. When the target travel path is set to the branch lane, the processing proceeds to step S13. If the target travel path is a straight traveling direction, the processing exits from the routine. The processing at step S12 corresponds to the branch lane determining unit of the technology.

At step S13, the entrance length Lb of the branch lane set as the target travel path is read. The entrance length Lb is a distance from the entrance start point P1 to the entrance end point P2 and is read from the static information of the local dynamic map stored in the high-accuracy road map database 16. If the entrance length Lb of the branch lane can be recognized with an image picked up by the onboard camera (21a, 21b) of the camera unit 21, the entrance length Lb of the branch lane is obtained from the forward traveling environment information obtained by the forward traveling environment recognizer 21d.

Then, at step S14, a target vehicle speed Vt at the lane change to the branch lane direction is set by referring to table data stored as fixed data in the storage unit in advance based on the entrance length Lb. A concept of the target vehicle speed table is exemplified in FIG. 6. The target vehicle speed table is set at every speed limit of the main lane (60 km/h, 80 km/h, 100 km/h and the like), and in the figure, the case where the speed limit (maximum speed) of the main lane is 80 [km/h] is exemplified.

In this case, the target vehicle speed Vt is between 60 and 80 km/h, and if the entrance length Lb is less than 100 m, the target vehicle speed Vt is fixed to 60 km/h, if the entrance length Lb is 1000 m or more, the target vehicle speed Vt is fixed to 80 km/h, and if the entrance length Lb is between 60 and 1000 m, the target vehicle speed Vt is set to be proportionally higher as the entrance length Lb gets longer.

That is, if the entrance length Lb of the branch lane is long, since entry into the branch lane can be performed by a gentle lane change, the target vehicle speed Vt does not have to be set lower than necessary. On the other hand, if the entrance length Lb of the branch lane is short, the lane change needs to be performed by somewhat rapid steering and thus, the target vehicle speed Vt needs to be set lower.

Subsequently, the processing proceeds to step S15, and the entrance length Lb is compared with an entrance-length determination threshold value Lbo set in advance. The entrance-length determination threshold value Lbo is for setting deceleration when the lane change to the branch lane is performed, and in a case of Lb Lbo, the processing proceeds to step S16, a target deceleration Dec is set to gentle deceleration Pg1 (Dec←Pg1), and the processing proceeds to step S18. In a case of Lb≤Lbo, the processing branches to step S17, the target deceleration Dec is set to rapid deceleration Pg2 (Dec←Pg2), and the processing proceeds to step S18. However, the target deceleration is Dec<0.

Figure 6:
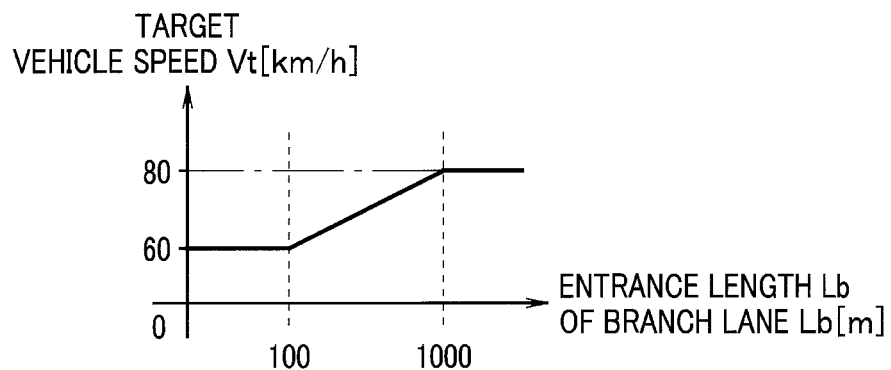
FIG. 6 is a conceptual diagram of a target vehicle speed table that sets a target vehicle speed corresponding to an entrance length of a branch lane.
Figure 7:
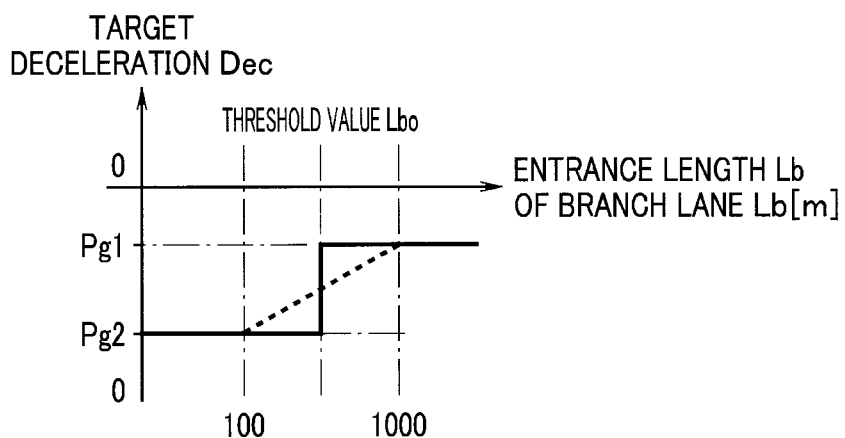
FIG. 7 is a graph illustrating setting of a target deceleration corresponding to the entrance length of the branch lane.

As illustrated in FIG. 7, the target deceleration Dec is set by two values of the gentle deceleration Pg1 and the rapid deceleration Pg2 by comparing the entrance length Lb and the entrance length determination threshold value Lbo, but as indicated by a broken line in the figure, the target deceleration Dec may be set so as to correspond to the target vehicle speed Vt illustrated in FIG. 6, and become higher as the entrance length Lb gets shorter between 100 to 1000 m.

At step S18, the own vehicle speed V km/h detected by the vehicle speed sensor constituting the autonomous traveling sensor 14 is read, the processing proceeds to step S19, the deceleration start distance Ldec is calculated based on the following expression (1), and processing exits from the routine:

$$Ldec \leftarrow (Vt^2 - V^2)/Dec \quad (1)$$

The expression (1) is for calculating a traveling distance until the target vehicle speed Vt is reached from the current vehicle speed V when deceleration is started at the set target deceleration Dec. The deceleration start distance Ldec relies on the target deceleration Dec if a difference $(Vt^2 - V^2)$ is the same. Thus, if the target deceleration Dec is set to the rapid deceleration Pg2, the traveling distance to reach the target vehicle speed Vt becomes shorter as compared with the case set to the gentle deceleration Pg1.

Figure 4:
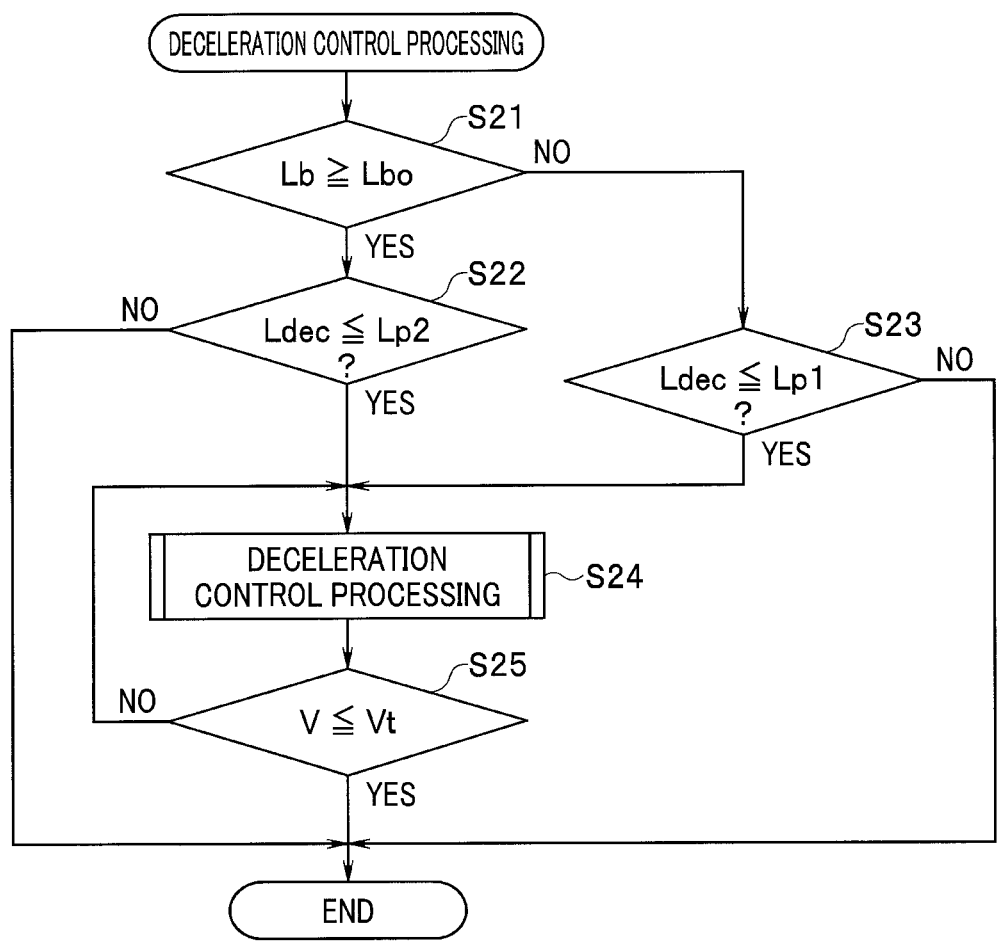
FIG. 4 is a flowchart illustrating a deceleration control processing routine.

The deceleration start distance Ldec is read in a deceleration control processing routine illustrated in FIG. 4.

The processing in the deceleration control processing routine and processing in a lane-change start control routine which will be described later correspond to the lane change calculator of the technology.

In the routine, first, the entrance length Lb of the branch lane is compared with the entrance length determination threshold value Lbo set in advance at step S21. The entrance length determination threshold value Lbo is for setting a start point of the deceleration start distance Lb, and in the case of Lb≥Lbo, that is, if the entrance length Lb is relatively long, the processing proceeds to step S22. In the case of Lb<Lbo, that is, if the entrance length Lb is relatively short, the processing branches to step S23.

At step S22, the deceleration start distance Ldec is compared with a distance Lp2 (see FIG. 9A) to the current location of the own vehicle M acquired with the entrance end point P2 of the branch lane as the start point, and whether deceleration can be executed is examined.

In a case of Ldec Lp2, it is determined that deceleration can be executed, and the processing proceeds to step S24. In a case of Ldec>Lp2, it is determined that deceleration cannot be executed, and the routine is finished.

On the other hand, at step S23, the deceleration start distance Ldec is compared with a distance Lp1 to the current location of the own vehicle M acquired with the entrance start point P1 (see FIG. 9B) of the branch lane as the start point, and whether deceleration can be executed is examined.

In a case of Ldec Lp1, it is determined that deceleration can be executed, and the processing proceeds to step S24. In a case of Ldec>Lp1, it is determined that deceleration cannot be executed, and the routine is finished.

When the deceleration start distance Ldec is determined to be Ldec>Lp2 at step S22 or the deceleration start distance Ldec is determined to be Ldec>Lp1 at step S23, if the driver performs the steering operation, the steering overrides, and the automatic driving control unit 26 cancels the automatic driving control. Thus, the own vehicle M can be made to change the lane to the branch lane direction by manual steering.

On the other hand, if the driver continues the automatic driving even after the deceleration start distance Ldec has been determined to be Lp2<0 or Lp1<0, the automatic driving control unit 26 causes the own vehicle to travel straight along the travel lane, during which the map locator calculator 12 constructs a new traveling route.

When the processing proceeds to step S24 from step S22 or step S23, the deceleration control processing is executed in order to decelerate the vehicle speed V of the own vehicle M to the target vehicle speed Vt before the lane change is made to the branch lane direction.

In the case of Lb Lbo (see FIG. 9A), the deceleration start position is set such that the deceleration control is finished at any position along the branch lane having passed at least a position P3 at which the lane width Wb of the branch lane becomes the threshold value Wbo or more. The threshold value Wbo can be set to any value as long as the own vehicle M is capable of traveling. For example, in the figure, the position P3 at which the lane width Wb of the branch lane becomes constant is the threshold value Wbo, but the vehicle width of the own vehicle M may be the threshold value Wbo. Alternatively, the threshold value Wbo may be a parameter set in advance.

Therefore, in FIG. 9A, the end point of the deceleration start distance Ldec is set to the position P3 or a position slightly passed through the position P3, and the deceleration start position is acquired by inversion.

In the case of Lb<Lbo (see FIG. 9B), the entrance start point P1 of the branch lane is set as an end point of the deceleration start distance Ldec, and the deceleration start position is acquired by calculating inversely from the entrance start point P1.

After the own vehicle M has reached the deceleration start position, the own vehicle M is decelerated in accordance with the target deceleration Dec set at step S16 or step S17 in the aforementioned routine illustrated in FIG. 3. At that time, a blinker on a lane change side is made to flicker in order to transmit an intension of the lane change to the following vehicle or vehicle around the own vehicle. If the brake controller 32 causes the brake to be operated, a brake lamp is lighted.

Then, the processing proceeds to step S25, and if the current vehicle speed V has not decelerated to the target vehicle speed Vt (V>Vt), the processing at step S24 is repeatedly executed. When the current vehicle speed V is V≥Vt, the deceleration control processing routine is finished.

Figure 8:
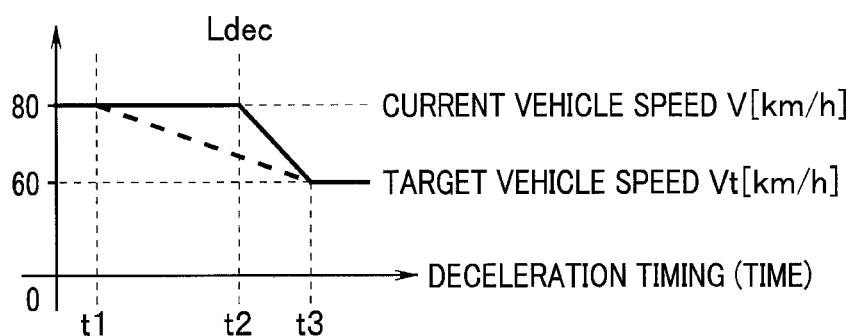
FIG. 8 is a time chart illustrating a deceleration start position for causing the vehicle speed to reach the target vehicle speed.

FIG. 8 exemplifies a time chart in a case where the entrance length Lb of the branch lane is relatively short (Lb<Lbo) and thus, the target vehicle speed Vt at the lane change is 60 km/h and the start point of the deceleration start distance Ldec is set to the entrance start point P1.

As indicated by a broken line in FIG. 8, if the deceleration start timing is set at time t1 before reaching the deceleration start distance Ldec, with the entrance start point P1 as a start point and gentle deceleration such as an engine brake is started at the time t1, and the vehicle speed V is decelerated so as to reach the target vehicle speed Vt at time t3, stable deceleration control can be performed. However, since the deceleration start timing is too early, the occupant of the own vehicle can feel unpleasant and irritated.

This also applies to a case where there is a following vehicle, and since the driver of the following vehicle does not know why the preceding vehicle is decelerating, it is likely that the driver determines the deceleration as unnecessary, and the driver of the following vehicle also feels irritated.

On the other hand, as in the embodiment, if the entrance length Lb of the branch lane is relatively short (Lb<Lbo), since the target deceleration Dec is set by the rapid deceleration Pg2 (Dec←Pg2), the deceleration start distance Ldec becomes short. Therefore, the deceleration is started at time t2 close to the time t3, and the occupant and the driver of the following vehicle do not feel an unpleasant feeling or a sense of discomfort and irritation.

Figure 5:
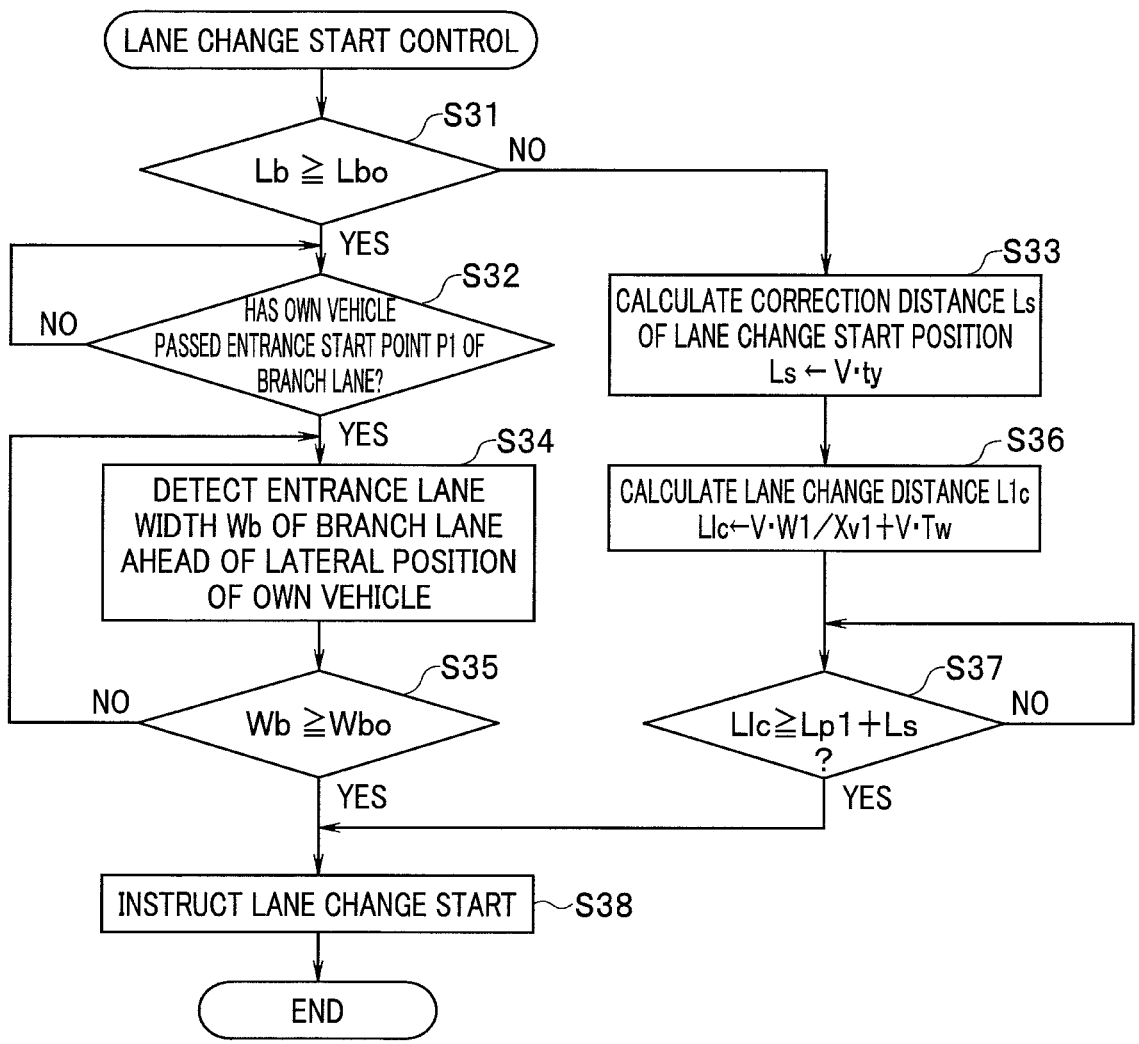
FIG. 5 is a flowchart illustrating a lane-change start control routine.

After the deceleration control is started in the deceleration control processing in the deceleration control processing routine, the lane-change start control routine illustrated in FIG. 5 is started.

In the routine, first, the entrance length Lb of the branch lane is compared with the entrance length determination threshold value Lbo at step S31. In the case of Lb Lbo, that is, when it is determined that the entrance length Lb is long, the processing proceeds to step S32. In the case of Lb<Lbo, that is, when it is determined that the entrance length Lb is short, the processing branches to step S33.

At step S32, whether the own vehicle M has passed the entrance start point P1 of the branch lane (see FIG. 9A) is examined based on the own vehicle location estimated by the own vehicle location estimation calculator 12a of the map locator calculator 12 and the entrance information of the branch lane stored in the static information of the local dynamic map stored in the high-accuracy road map database 16. Alternatively, the examination may be made based on the information on the lane markers marking right and left of the branch lane and the own vehicle lateral position that are recognized by the forward traveling environment recognizer 21d of the camera unit 21.

If the own vehicle M has not passed the entrance start point P1 yet, the processing at step S32 is repeatedly executed. When it is determined that the own vehicle M has passed the entrance start point P1, the processing proceeds to step S34. In the aforementioned deceleration control processing routine, the deceleration control is set to be finished at the position P3 at which the lane width becomes constant and which is located ahead of the entrance start point or at the position further ahead of the position P3. However, since an error occurs between the position where the deceleration control is set to be finished and the position at which the target vehicle speed Vt is actually reached, passage of the entrance start point P1 needs to be detected.

At step S34, the lane width Wb of the branch lane entrance ahead of the lateral position of the own vehicle M (lane width between the right and left lane markers of the branch lane) is detected. The lane width Wb is examined based on the own vehicle location estimated by the own vehicle location estimation calculator 12a and the entrance information of the branch lane stored in the static information of the local dynamic map. Alternatively, the lane width Wb may be examined based on the information on the lane markers marking the right and left of the branch lane recognized by the forward traveling environment recognizer 21d.

Then, at step S35, the lane width Wb of the branch lane is compared with the threshold value Wbo. The threshold value Wbo can be set to any value set as long as the own vehicle M can pass through the lane width. Therefore, as illustrated in FIG. 9, the lane width of the position P3 at which the lane width Wb of the branch lane becomes constant may be the threshold value Wbo, or the vehicle width of the own vehicle M may be the threshold value Wbo. Alternatively, the threshold value Wbo may be a parameter (fixed value) set in advance.

In a case of Wb<Wbo, that is, if the lane width Wb has not reached the threshold value Wbo, the processing returns to step S34, and the processing at steps S34 and S35 is repeatedly executed. In a case of Wb Wbo, that is, if the lane width Wb has reached the threshold value Wbo (P3 in FIG. 9A), it is determined that the own vehicle has reached the lane change start position, and the processing proceeds to step S38.

On the other hand, when the processing proceeds from step S31 to step S33, a correction distance Ls of the lane change start position is calculated from Ls←V·Ty. Here, V is a current own vehicle speed, ty is allowance time, and the allowance time Ty can be set to any value such as 1 to 3 sec or the like.

After that, the processing proceeds to step S36, and a lane change distance $L1c$ required for entering from the travel lane (the first travel lane in FIG. 9) to the branch lane (going out of the travel lane) is calculated from $L1c \leftarrow V \cdot W1/Xv1 + V \cdot Tw$. Here, W1 is a lane width of the travel lane (the first travel lane in FIG. 9), Xv1 is a maximum value Xv1

(parameter) of a lateral speed in the lane change control, and Tw is lighting time of a blinker that is made to flicker before the lane change.

Then, the processing proceeds to step S37, and a value obtained by adding the correction distance Ls of the lane change start position to the distance Lp1 to the entrance start point P1 is compared with the distance (lane change distance) L1c required for the lane change. Then, in a case of L1c<Lp1+Ls, the processing at the step S37 is repeatedly executed, and when the distance L1c becomes L1c≥Lp1+Ls (P5 in FIG. 9B), it is determined to be the lane change start position, and the processing proceeds to step S38.

At step S35 or when the processing proceeds from step S37 to step S38, a lane change start instruction is output, and the routine is finished.

When receiving the lane change start instruction, the automatic driving control unit 26 executes the lane change control. In the lane change control, first, the blinker on the branch lane side is made to flicker for predetermined time Tw (3 sec, for example), and after the lane change is notified to the vehicles around the own vehicle, a steering signal is transmitted to the steering controller 31, and the own vehicle M is made to change the lane to the branch lane side. Then, when the steering angle is returned so that the own vehicle M drives along the branch lane, the lane change control is finished.

As a result, as illustrated in FIG. 9B, when the entrance length Lb of the branch lane is relatively short, the lane change is started at the position obtained by adding the correction distance Ls to the entrance start point P1, that is, before the lane width Wb of the branch reaches the threshold value Wbo and thus, the lane change can be made in accordance with the driver's sense without discomfort. Therefore, the automatic driving control unit 26 includes a function as a traveling state controller of the technology.

As described above, in the embodiment, in the lane change to the branch lane when the entrance length Lb of the branch lane is long as illustrated in FIG. 9A, first, the vehicle speed V is decelerated to the target vehicle speed Vt by performing deceleration at the gentle deceleration Pg1. Then, the lane change is started after the position at which the lane width Wb of the branch lane becomes the threshold value Wbo or more is passed, and comfortable lane change can be made smoothly.

As illustrated in FIG. 9B, when the entrance length Lb of the branch lane is relatively short, first, deceleration is performed at the rapid deceleration Pg2 so that the vehicle speed reaches target vehicle speed Vt at the entrance start point P1. Therefore, since the deceleration start position is close to the entrance start point P1, the unpleasant feeling or discomfort is not given to the occupant of the own vehicle M or the driver of the following vehicle. As a result, the lane change can be made smoothly without discomfort in accordance with the entrance length Lb of the branch lane.

The technology is not limited to the aforementioned embodiment but if the preceding vehicle is to change the lane to the same branch lane direction as the own vehicle M, for example, the own vehicle M may change the lane by setting a traveling trajectory of the preceding vehicle as the target travel path.

Each of the map locator calculator 12, the forward traveling environment recognizer 21d, and the automatic driving control unit 26 illustrated in FIG. 1 can be implemented by the aforementioned microcomputer, and also by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the map locator calculator 12 including the own vehicle location estimation calculator 12a and the traveling route setting calculator 12b, and the automatic driving control unit 26. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

As described above, according to the technology, when the own vehicle is made to perform the lane change to the branch lane direction by the automatic driving, the deceleration start position and the lane change start position of the own vehicle are acquired based on the driving state and the traveling environment of the own vehicle, and the traveling state of the own vehicle is controlled based on the deceleration start position and the lane change start position and thus, in the lane change to the branch lane direction from the main lane by the automatic driving, smooth lane change can be made without giving an unpleasant feeling or discomfort to the occupant of the own vehicle or the driver of the following vehicle.

The invention claimed is:

1. An automatic driving assistance apparatus comprising:
a driving state acquirer configured to acquire a driving state of an own vehicle;
an own vehicle location acquirer configured to acquire a location of the own vehicle;
a traveling environment information acquirer configured to acquire a traveling environment in which the own vehicle is traveling; and
at least one processor configured to read instructions from at least one machine readable medium,
wherein when the instructions are executed by the at least one processor, the at least one processor is configured to:
examine whether a target travel path toward which the own vehicle travels is set to a branch lane;
when the target travel path is determined to be set to the branch lane, obtain a deceleration start position and a lane change start position of the own vehicle, based on 1) the acquired driving state acquired by the driving state acquirer, 2) the acquired traveling environment acquired by the traveling environment acquirer, and 3) an entrance length between an entrance start point and an entrance end point of the branch lane obtained from a road map database; and control a traveling state of the own vehicle based on the obtained deceleration start position and the obtained lane change start position.

2. The automatic driving assistance apparatus according to claim 1, wherein when setting the deceleration start position is obtained, the at least one processor is configured to obtain a deceleration start distance based on 1) an own vehicle speed of the own vehicle, 2) a target vehicle speed after the deceleration is finished, and 3) target deceleration during the deceleration.

3. The automatic driving assistance apparatus according to claim 2, wherein the target deceleration is set based on the entrance length of the branch lane such that the higher the deceleration is, the shorter an entrance length is.

4. The automatic driving assistance apparatus according to claim 2, wherein the lane change start position is set with an entrance start point as a reference if the entrance length is shorter than an entrance length determination threshold value and with a position at which a lane width of the branch lane becomes a constant lane width as the reference if the entrance length is longer than the entrance length determination threshold value, based on the entrance length of the branch lane.

5. The automatic driving assistance apparatus according to claim 4, wherein the lane change start position is set, with the entrance start point as the reference, to a position shifted from the entrance start point calculated based on the own vehicle speed and predetermined allowance time set in advance.

6. The automatic driving assistance apparatus according to claim 1, wherein the lane change start position is set with an entrance start point as a reference if the entrance length is shorter than an entrance length determination threshold value and with a position at which a lane width of the branch lane becomes a constant lane width as the reference if the entrance length is longer than the entrance length determination threshold value, based on the entrance length of the branch lane.

7. The automatic driving assistance apparatus according to claim 6, wherein the lane change start position is set, with the entrance start point as the reference, to a position shifted from the entrance start point calculated based on the own vehicle speed and predetermined allowance time set in advance.

8. An automatic driving assistance apparatus comprising:
circuitry configured to
acquire a driving state of an own vehicle,
acquire a location of the own vehicle,
acquire a traveling environment in which the own vehicle is traveling,
examine whether a target travel path toward which the own vehicle travels is set to a branch lane,
when it is determined that the target travel path is set to the branch lane, obtain a deceleration start position and a lane change start position of the own vehicle based on 1) the driving state, 2) the traveling environment, and 3) an entrance length between an entrance start point and an entrance end point of the branch lane obtained from a road map database, and
control a traveling state of the own vehicle based on the obtained deceleration start position and the lane change start position.

9. An automatic driving assistance apparatus comprising:
a driving state acquirer configured to acquire a driving state of an own vehicle;
an own vehicle location acquirer configured to acquire a location of the own vehicle;
a traveling environment information acquirer configured to acquire a traveling environment in which the own vehicle is traveling; and
at least one processor configured to read instructions from at least one machine readable medium,
wherein when the instructions are executed by the at least one processor, the at least one processor is configured to:
when the own vehicle is running on a main lane, determine whether a target travel path toward which the own vehicle travels is set to a branch lane branching from the main lane; and
when the target travel path is determined to be set to the branch lane, execute a lane change process changing a travel lane of the own vehicle from the main lane to the branch lane by controlling a deceleration and a steering of the own vehicle, and
wherein when the lane change process is executed by the at least one processor, the at least one processor is configured to:
determine a vehicle speed of the own vehicle based on the driving state;
determine an entrance length between an entrance start point and an entrance end point of a lane changeable section between the main lane and the branch lane before the own vehicle reaches the entrance start point;
determine a target vehicle speed based on the entrance length, the target vehicle speed increases as the entrance length increases in the range below a speed limit of the main lane;
when the entrance length is equal to or longer than an entrance length determination threshold value, 1) start the deceleration at a first deceleration after the own vehicle passes the entrance start point, and 2) start the steering for changing the travel lane of the own vehicle from the main lane to the branch lane after the vehicle speed reaches the target speed; and
when the entrance length is shorter than the entrance length determination threshold value, 1) start the deceleration at a second deceleration that is higher than the first deceleration so that the vehicle speed at a time the own vehicle reaches the entrance start point reaches the target speed, and 2) start the steering for changing the travel lane of the own vehicle from the main lane to the branch lane after the vehicle speed reaches the target speed.

10. The automatic driving assistance apparatus according to claim 9, wherein when the lane change process is executed by the at least one processor, the at least one processor is configured to:
when the entrance length is equal to or longer than an entrance length determination threshold value, start the steering for changing the travel lane of the own vehicle from the main lane to the branch lane after a width of the branch lane is equal to or greater than a width of the own vehicle, and
when the entrance length is shorter than the entrance length determination threshold value, start the steering for changing the travel lane of the own vehicle from the main lane to the branch lane even if the width of the branch lane is less than the width of the own vehicle.

11. The automatic driving assistance apparatus according to claim 9, wherein the at least one processor is configured to determine the entrance length based on a road map database.

12. The automatic driving assistance apparatus according to claim 10, wherein the at least one processor is configured to determine the entrance length and the width of the branch lane based on a road map database.

* * * * *